United States Patent [19]
Tansley

[11] Patent Number: 5,818,977
[45] Date of Patent: Oct. 6, 1998

[54] PHOTOMETRIC MEASUREMENT APPARATUS

[75] Inventor: Brian Tansley, Manotick, Canada

[73] Assignee: Her Majesty the Queen in Right of Canada as represented by the Minister of Supply and Services and of Public Works, Ottawa, Canada

[21] Appl. No.: 596,922

[22] Filed: Mar. 13, 1996

[51] Int. Cl.$^6$ ................................. G06K 9/32
[52] U.S. Cl. ........................... 382/294; 380/284
[58] Field of Search ................... 382/294, 282, 382/321, 284; 348/367, 362, 363; 354/410, 420, 401, 403, 409

[56] References Cited

U.S. PATENT DOCUMENTS

| | | | |
|---|---|---|---|
| 4,962,425 | 10/1990 | Rea | 358/139 |
| 5,239,625 | 8/1993 | Bogart et al. | 382/284 |
| 5,353,095 | 10/1994 | Terashita | 355/38 |
| 5,418,596 | 5/1995 | Goto | 354/403 |
| 5,528,290 | 6/1996 | Saund | 382/284 |
| 5,534,965 | 7/1996 | Higaki et al. | 354/409 |
| 5,541,705 | 7/1996 | Kan et al. | 354/432 |
| 5,581,637 | 12/1996 | Cass et al. | 382/294 |
| 5,614,972 | 3/1997 | Wakabayashi et al. | 396/135 |

*Primary Examiner*—Yon J. Couso
*Attorney, Agent, or Firm*—Marks & Clerk; Richard J. Mitchell

[57] ABSTRACT

A photometric measurement apparatus, includes a digital video camera for generating digital data representing the image of a scene of interest, a device for stepwise changing the exposure duration of the camera; a device for controlling the camera to create automatically a series of digital images of the same scene over a range of different exposures; a device for storing the digital images; a device of assembling data from the series of digital images to create a single composite digital image containing information from at least some of the digital images and representing an intensity dynamic range greater than that obtainable from what can be measured from any single image; and a device for storing said assembled data representing said composite digital image.

19 Claims, 14 Drawing Sheets

PHOTOMETRIC MEASUREMENT APPARATUS

BACKGROUND OF THE INVENTION

This invention relates to an apparatus for capturing a digital image of a scene with a wide intensitive dynamic range and for processing information contained within all or part of the captured image.

There are many situations where a need arises to make photometric measurements over a scene. For example, lighting installations (such as airport runway lighting road lighting, building lighting, aircraft cockpit lighting, sports arena lighting) are often designed to meet or exceed minimum criteria for luminance, luminous intensity or illumination. The minimal criteria are typically specified in the appropriate regulations.

The traditional approach to light measurement is to take photometric measurements of small areas with a spot photometer. When measuring the light intensity distribution within entire scenes one must provide a means of scanning the scene in a stepwise manner, one spot measurement at a time. This requires moving the measurement aperture of the spot photometer in relation to the scene—a method that is imprecise and slow at best. Only through the use of additional precision positioning equipment can the user make repeatable measurements with this technology.

An alternative approach is to capture an image of the scene with a camera. However, in order to be able to make photometrically valid measurements every location within the captured scene has information regarding the light intensity emanating from the corresponding location in the original image. This approach would not only speed up the data acquisition process but would also promote greater accuracy of measurement, since the spatial relationship among all elements in the scene are precisely preserved.

Unfortunately, the intensity dynamic range of many real scenes of interest far exceeds the capture range of all but the most expensive electronic camera systems. Consequently, useful measurements with a conventional video camera are only possible for images containing relatively small luminance ranges.

An object of the invention is to overcome this problem.

SUMMARY OF THE INVENTION

According to the present invention there is provided a photometric measurement apparatus, comprising a digital video camera for generating digital data representing the image of a scene of interest; means for stepwise changing the exposure duration of the camera; means for controlling said camera to create automatically a series of digital images of the same scene over a range of different exposures; means for storing the digital images; means for assembling data from said series of digital images to create a single composite digital image containing information from at least some of said digital images and representing at each picture element an intensity dynamic range greater than that obtainable from any single image; and means for storing said assembled data representing said composite digital image.

In this specification the expression "photometric" may include the measurement of electromagnetic radiation outside the visible spectrum. "Exposure" refers to the total number of quanta incident upon the camera's photosensitive detector array. In the most general sense, exposure can be varied by altering the optical aperture of the camera's lens or by varying the frame sampling period of the detector array. In the preferred embodiment, exposure is varied electronically.

Using the present invention, an operator can instruct the system to record one or more scenes and store them as digital files. He or she can then perform a detailed photometric analysis of the captured scenes by loading their digital image files into a computer running the system software. An image of the scene is shown on the computer's visual display and areas of interest can be identified with a pointing device such as a mouse or light pen. Spot photometric measurements can be made by locating the pointing device on appropriate points of interest.

The intensity information is normally stored in a digital file that contains more information regarding the intensity at every sampled point in the image than can be shown on the computer visual display. This makes it necessary to produce (1) a compressive transformation of the photometric data range in the original scene for use in generating the image on the visual display monitor of the computer and (2) a means of relating each spatial point representing values in the displayed image to a corresponding point in the image intensity information file.

Since complete information is stored in the image intensity information file, complex photometric analyses can be performed to produce results in any form desired. Using the invention the operator can make measurements from the image on the computer's visual display as if he or she were actually present at the location where the original scene was captured. This is because all of the relevant intensity information is stored in a digital image file even though only a fraction of it can actually be represented in the displayed image.

The camera is normally a digital still-frame device employing a charge-coupled device (CCD) array as the image detector outputting a series of digital words, each representing the intensity of one spatially quantized picture element (pixel) in the captured image. Each of these digital words is the result of an analog to digital (A/D) conversion process, whereby the signal charge on a given pixel photosite is converted to one of a number of discrete digital words, followed by the application of a calibration transformation equation. The calibration transformation equation is a function of several variables, including the location of the pixel in the spatial array, the lens aperture, focal length and focus distance, the frame sample and hold period and the spectral correction filter employed in the system at the time of image capture.

Since the analog to digital conversion process is not linear over its full dynamic range, only a subset, typically the middle portion, of the conversion scale applied to any single captured image is used as valid data for assembly into the composite image used for measurement purposes. This necessarily reduces the number of discrete digital steps that can be created from any given frame from that of an optimal A/D converter. In a preferred embodiment of the invention, the useful dynamic range of the A/D conversion process is estimated iteratively by presenting the camera with a large series of controlled spatially homogeneous images of different average intensity and measuring the digital response to each. By fitting a polynomial equation to each set of data obtained in this way, the coefficients of each fitted polynomial can be used as a description of the operating characteristics of the camera in response to lights of different intensities. The intermediate values of the function represent the region of response whereby each small incremental change in the number of quanta incident upon any given spatial region of the detector is represented by a small increment in the associated resulting digital value in the captured image.

The range of intermediate values on the A/D conversion scale will define the resolution accuracy of each individual pixel intensity value in the temporary composite image array. The image intensity information file results from the process of archiving this temporary array file upon a mass storage device.

The invention also provides a camera for performing photometric measurements from images captured from scenes, comprising a sensor array for transducing information carried to the camera from the scene by photons into an electrical signal and from that signal to an array of digital words; means for stepwise changing the rate of exposure of quanta incident upon the array from a scene of interest; means for controlling said exposure changing means to crease automatically a series of images of the same scene over a range of exposures; means for storing said images as digital files; means for transmitting said digital files for further processing.

BRIEF DESCRIPTION OF THE DRAWINGS

The invention will now be described in more detail, by way of example, only with reference to the accompanying drawings, in which.

DESCRIPTION OF THE PREFERRED EMBODIMENTS

Figure 1:
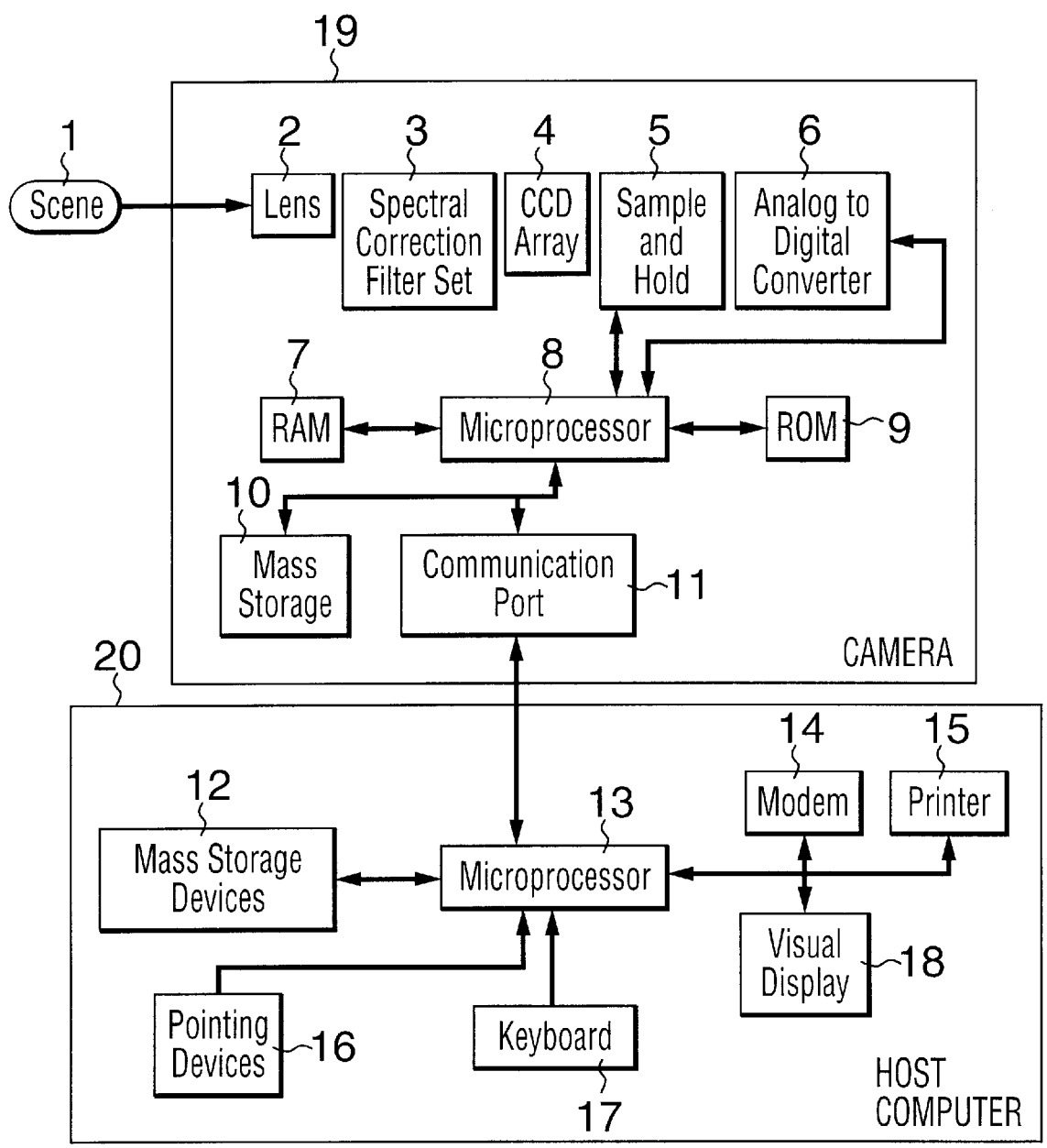
FIG. 1 is a block diagram of the hardware components of one embodiment of the invention, including a diagram of an intelligent camera containing components to perform some of the functions for obtaining and temporarily storing, on board, an array of images of the same scene, each with a different exposure.

Referring first to FIG. 1, the two major hardware components of the system are the digital camera 19 and host computer 20, typically a Pentium-based personal computer running a windows™ operating system. Light from a scene 1 is collected and attenuated by the variable aperture of the camera lens 2 and passed through a spectral correction filter 3 before being imaged upon the camera's CCD array detector 4. The scene 1 can be any large scale or small scale scene over which it is desired to make photometric measurements. For example, a view of the earth from space, the lighting distribution in a theatrical attraction, the visual computer display on a desk in an open-plan office, a lit roadway, an airport taxiway guidance sign, the legend detail within a visual display from an aircraft cockpit, the floor of a tennis court, the beam pattern from an automobile headlamp, a self-luminous emergency exit sign, etc.

The lens 2 can be adapted to provide an image upon the CCD array 4 from scenes of arbitrary distance from the camera. The spectral correction filter 3 can be one of a set of spectral correction filters that can be separately positioned into the optical path of the camera. Each filter of the set of spectral correction filters can be used to produce a different overall effective spectral sensitivity to the camera.

The exposure duration of the CCD detector 4 is controlled by a sample and hold circuit 5, itself under control of a microprocessor 8 whose operating instructions are stored in an electrically programmable read-only memory 9. The microprocessor 8 processes digital information obtained from the analog to digital converter and generates temporary image files which are stored in local random access memory 7 on board the camera. Temporary image files can also be stored on mass storage devices 10 if transmission to the host computer is not immediately feasible.

The digital camera 19 is typically connected to a host computer 20 through a communication port such as a high speed bidirectional parallel interface. The host computer typically consists of a microprocessor 13, one or more mass storage devices 12, a human interface consisting of a keyboard 17, a pointing device 16 and visual display 18, a machine interface consisting of a modem 14 and printer 15.

Figure 2:
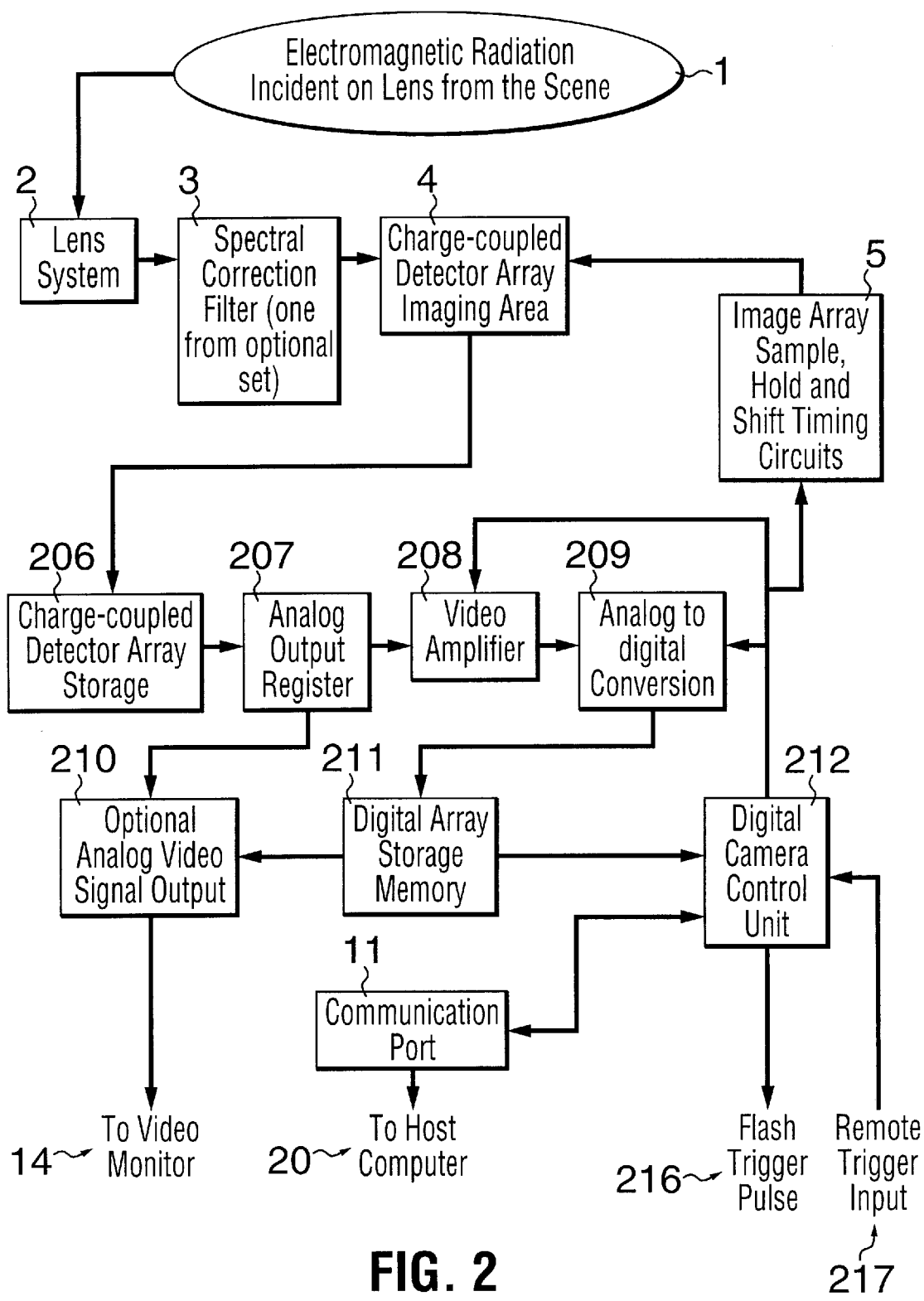
FIG. 2 shows the functional components of the camera system.

In order to capture the full intensity dynamic range of a scene 1, the operator mounts the digital camera 19 on a stable platform and connects it to a host computer 20. He or she then aims and focuses the camera upon the scene of interest with the aid of a bitmap of the output of the camera displayed in a window upon the visual display 18 of the host computer system 20. Once the user has focused and set the camera to his/her satisfaction, the system proceeds to automatically compute the optimal single exposure that will be used as the display bitmap image. The image capture process then proceeds as follows:

FIG. 2 shows a schematic of the image capture process of a preferred embodiment of the digital camera. As is known, filtered and focused light made incident upon the imaging area of a CCD array 4 causes displacement of electrons in the crystalline structure of silicon. This displacement results in the accumulation of charge carriers within the localized regions near each photosite in the array. The initial spatial distribution of charge across the detector array substrate is replenished by charging the array via the sample and hold timing circuit 5. The charge distribution process is under timing control of the digital camera control unit 112. At the end of the sample and hold period controlled by timing circuits 5, the image is represented on the CCD imaging area by a spatially differential charge distribution within the detector array 4. The time period between replenishment of charge carriers in the substrate is known as the frame sampling period. The frame sampling period is the time during which the action of light within the image focused upon the array is able to cause a differential spatial charge upon the detector and is, thus, analogous to exposure duration for conventional photographic film. Additional circuits cause the charge distribution located in the detector array 4 to be shifted into an adjacent storage array 206 which is shielded from light.

From the storage array the image is scanned pixel by pixel and output through the analog output register 207 to a video amplifier 208 whose gain is programmable under control of the digital camera control unit 212. At this stage the amplified signal is converted from analog to digital form 209, formatted into a digital array and stored in digital array storage memory 211. From this memory the digital image remains available to be reconverted and conditioned into an analog signal 210 suitable for displaying on a television monitor 214 or formatted by the digital camera control unit 212 for communication as a digital file string through a communication port 11 to a host computer 20. The digital camera control unit 212 also provides a trigger signal 216 synchronous with the initiation of a frame sampling period. The unit 212 also accepts remote trigger inputs 217 for initiating the picture taking sequence from an asynchronous external source.

Figure 3:
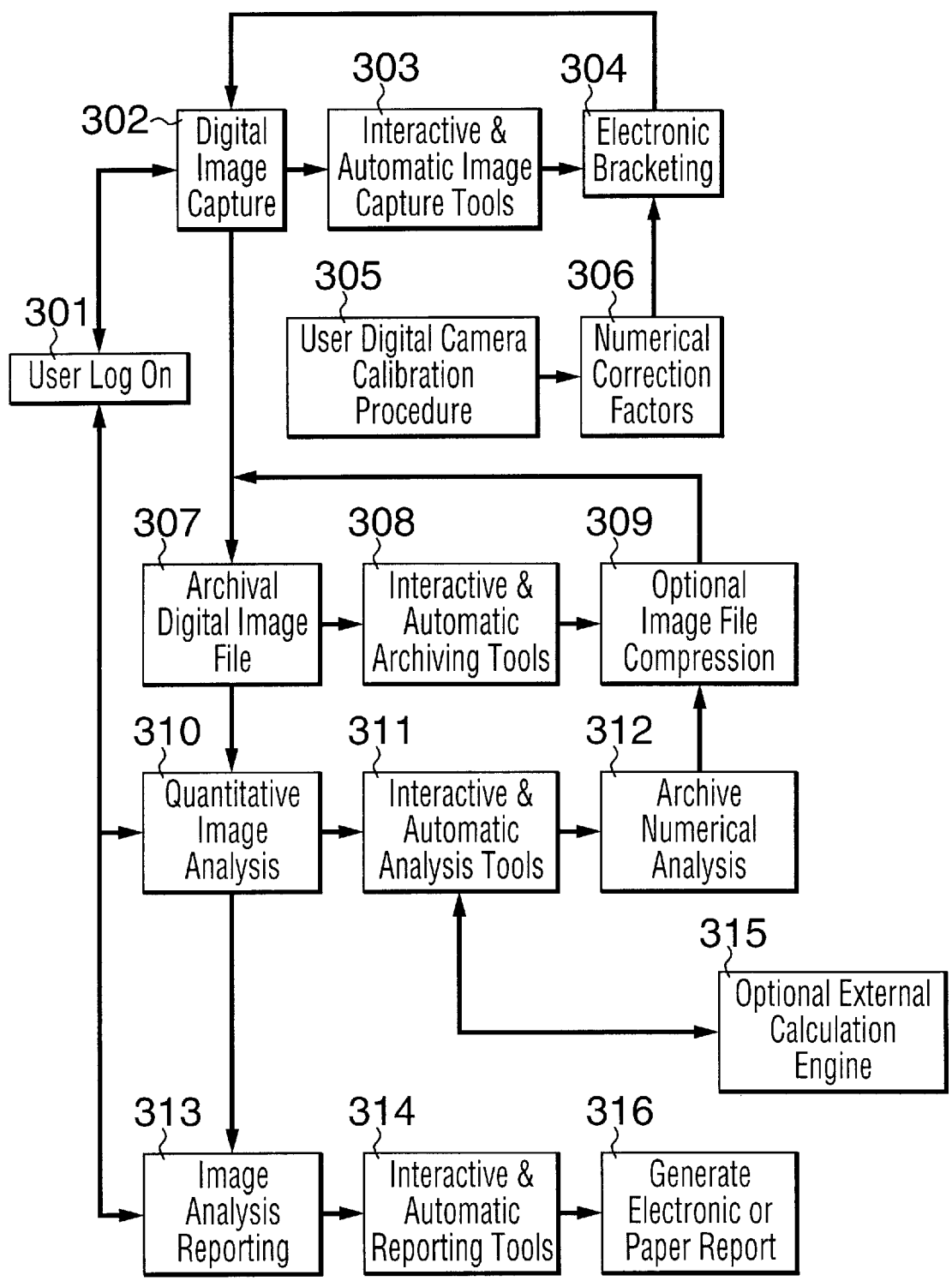
FIG. 3 provides an overview of a photometric image analysis system in accordance with the invention.

FIG. 3 shows an overview of the functional components of a photometric image analysis system in accordance with the invention. The initial task for the user is to log on to the system 301. This process has two purposes: to ensure that only authorized users have access to the system and that pertinent information is available to the system regarding the identity and contact data (telephone numbers, etc.) of individuals who capture images and/or perform quantitative analysis upon them. After the user has logged onto the system 301 he or she has four initial options: to capture digital images at 302 with the camera 19; to perform quantitative image analysis upon captured files 310; to produce reports on the results of previous analyses 313 and to perform calibration procedures on the camera 305. The first three of these options, 302,310 and 313, lead the user to the use of associated interactive and automatic tools 303, 311,314, that assist in the prosecution of the various associated information processing tasks. If the user opts for digital image capture 302 the system provides a set of interactive and automatic image capture tools 303 that assist the user in programming the system to capture the full intensity dynamic range of a scene.

Figure 4:
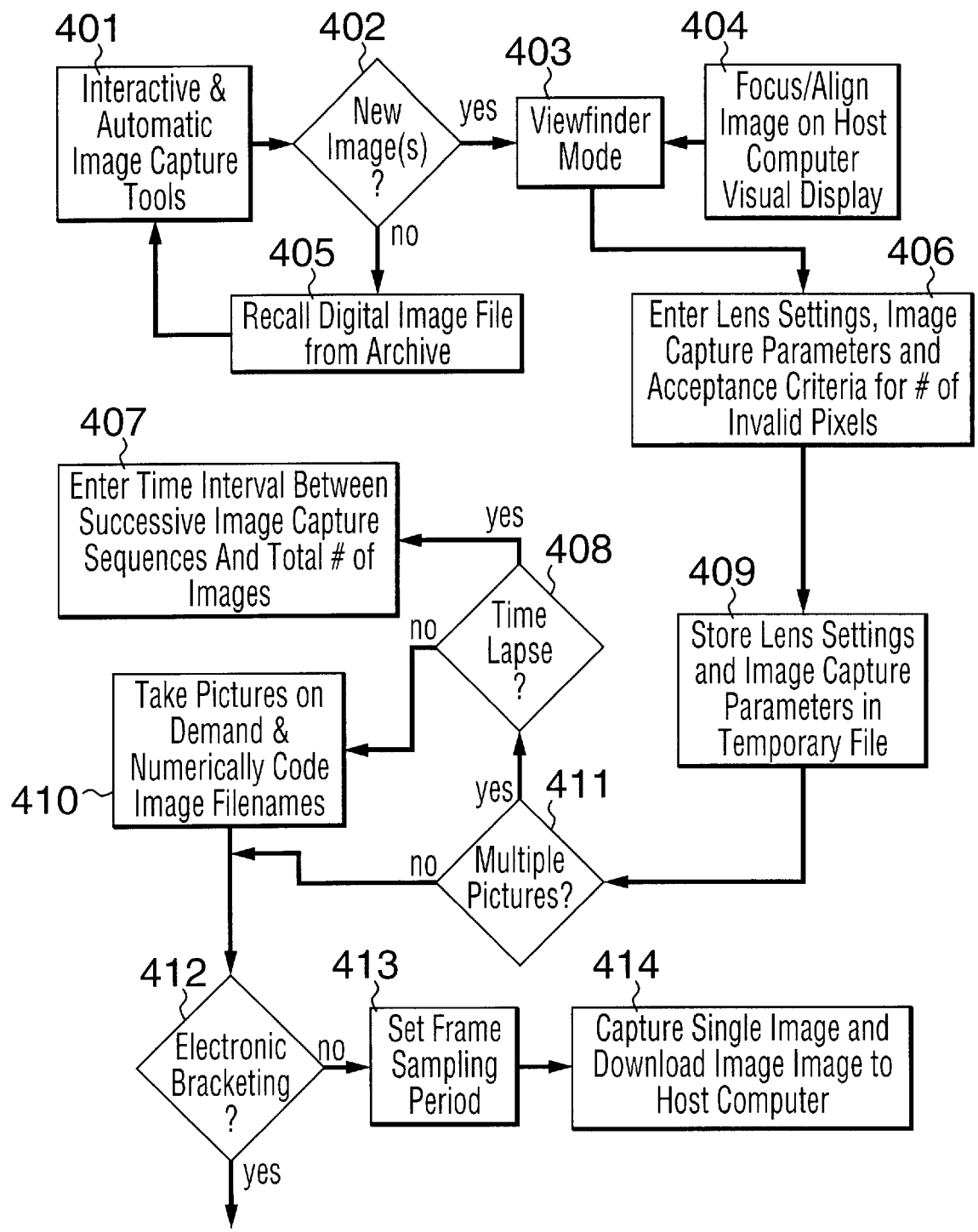
FIG. 4 is a schematic of the system components involved in image capture.

FIG. 4 shows more detail regarding the image capture tools. The user first decides if a new image is to be acquired at decision 402. If a previously acquired image is to be loaded into the host the system recalls a digital image file from the image archive 405. If new images are to be acquired the system invokes the electronic viewfinder mode 403 which provides the user with visual feedback from the camera on the computer visual display that can be used to focus and align the image 404. Once this process has been completed the user enters the lens settings and other information 406 into the host computer, including the acceptance criteria for the number of invalid pixels within the captured scene. This criterion is used by the system to decide when to stop collecting intensity data from a scene, as shown in FIG. 5.

The system then establishes a temporary file 409 that includes the various entered parameters and data obtained from the viewfinder mode 3. The user then decides if multiple pictures are required 411. If so, the user is then given the choice 408 of having the multiple pictures taken by an automatic time lapse process 407 or on manual command through keyboard entry on the host computer (FIGS. 1, 17) or through an electronic trigger input to the camera (FIGS. 2, 17). An additional decision is made by the user regarding the dynamic range of the image to be captured. If the user opts for electronic bracketing 412 an image capture sequence is initiated which culminates in the assembly of a composite intensity information file. If the user does not opt for electronic bracketing, then the system sets the exposure frame sampling period 413 and captures a single image for downloading into the host computer 414.

Figure 5:
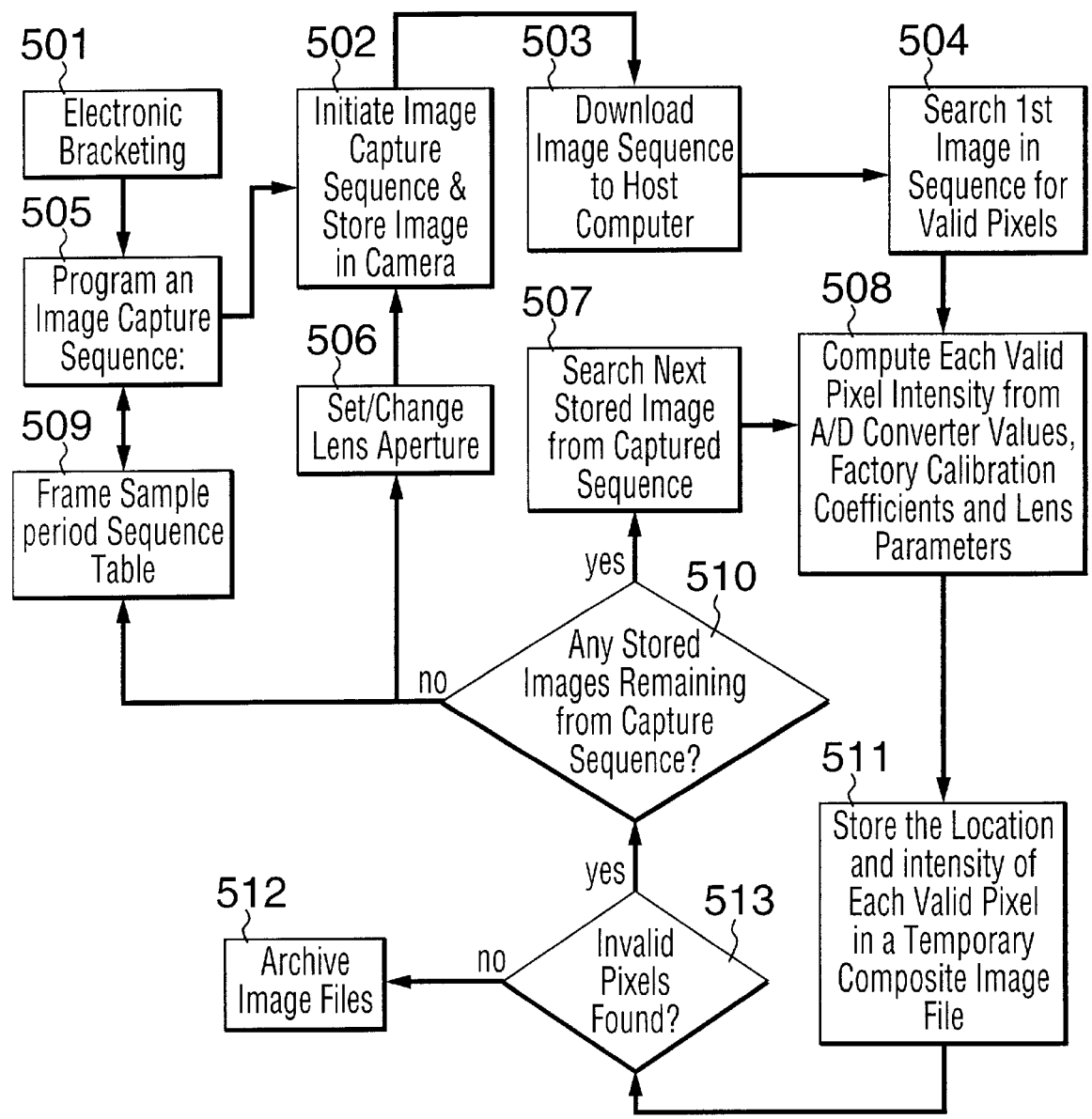
FIG. 5 illustrates the electronic bracketing system.
Figure 6:
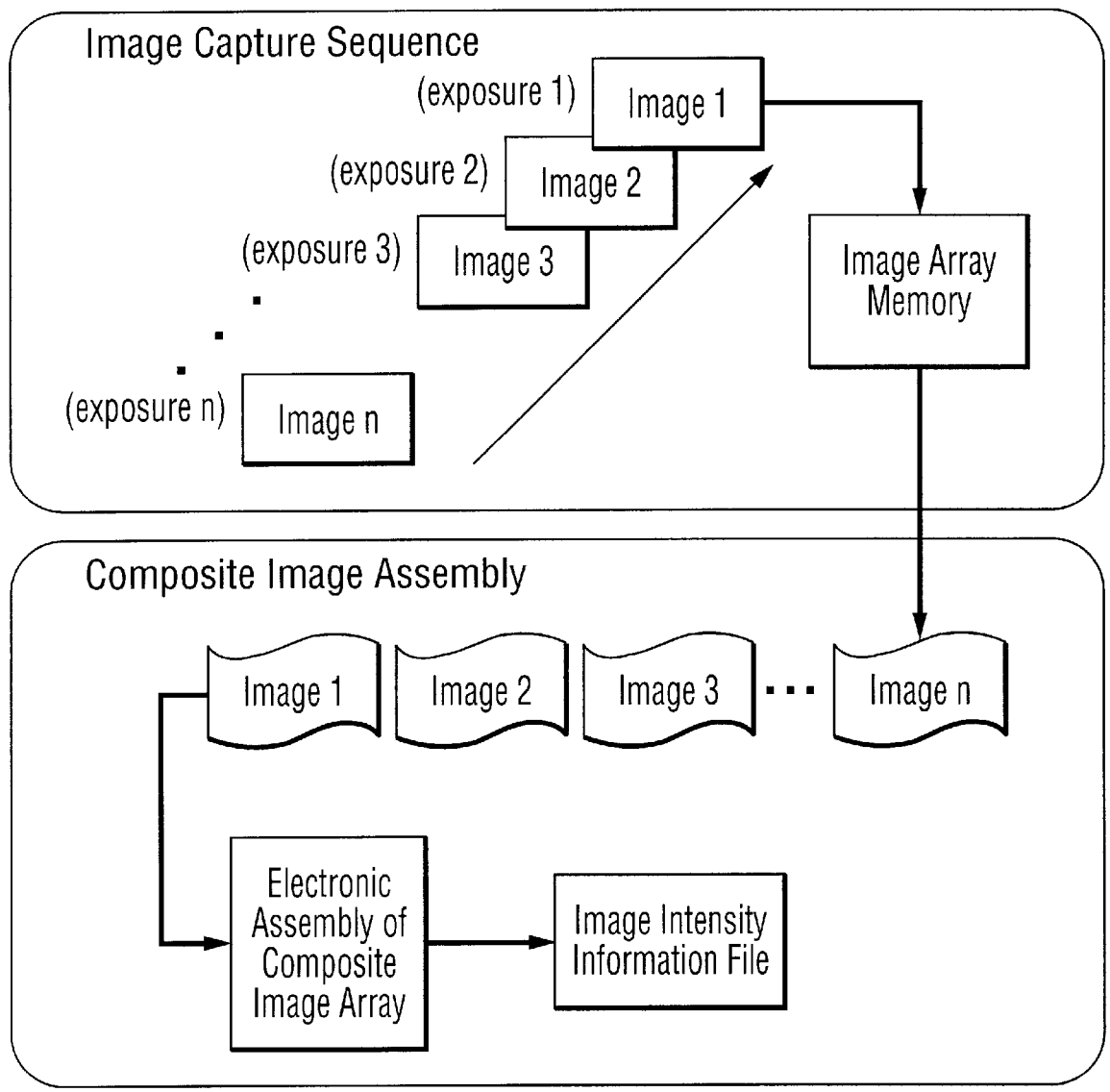
FIG. 6 shows the relationship between the image capture sequence and the assembly of the composite image array, leading to the production of the image intensity information file.
Figure 9:
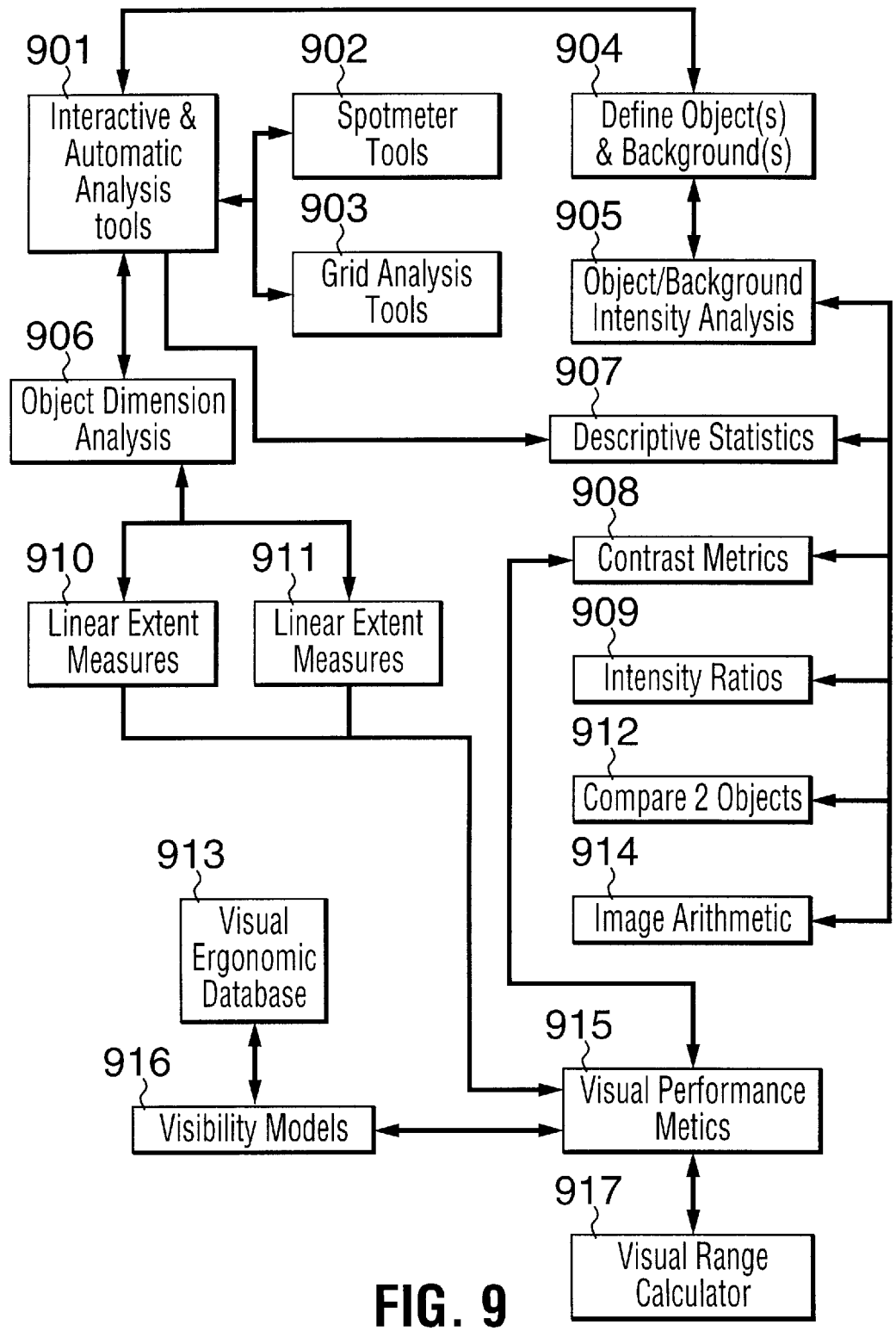
FIG. 9 shows the range of interactive and automatic analysis tools available within the system that can be applied to a captured image file.

FIG. 5 shows the details of the electronic bracketing procedure. FIG. 6 shows how electronic bracketing is implemented in a preferred embodiment as two sequential processes—one involving the capturing of a sequence of images and the other involving the production of an electronically assembled composite image. The electronic assembly process results in an image intensity information file containing data from the pixels locations of at least some of the images obtained in the image capture sequence and stored in image array memory. Referring to FIG. 5; first, an image capture sequence is programmed 505 and used to initiate an image capture sequence 502 resulting in a series of images being taken of a scene, each captured at a different frame sampling period. The data from the first captured image are downloaded into the host computer 503 where all pixels in the image are evaluated for valid pixels 504. The intensity of each valid pixel is computed by referring to one of a set of polynomial equations chosen on the basis of information regarding the lens settings entered in the Viewfinder mode and stored in a temporary file (FIGS. 4, 9). From this selected polynomial equation the A/D converter values are transformed into actual photometric measurement units. These units are then stored in a temporary composite image file 511. The system continues this process until all valid pixels have been converted in this way. It then searches for the presence of invalid pixels 513.

If invalid pixels are found in this image, it is determined if there are any additional images are present in the image capture sequence 510. If there are, the next stored image from the capture sequence is searched for valid pixels 507 and the conversion process is repeated on them. Following this the system queries for remaining invalid pixels and repeats this process until either no more invalid pixels are found or invalid pixels are found but no more images are present in the capture sequence. If the latter is true, the system programs a second image capture sequence, but with a different aperture setting on the camera lens 506. Once this second sequence is captured the process of converting valid pixels to photometric data begins again. This process iterates until either (1) all pixel addresses have been entered with valid data or no additional lens aperture settings can be found that will generate a reduction in the number of remaining invalid pixels. At this point the image is optionally archived 512.

Referring to the overview FIG. 3: The user may also optionally perform certain digital camera calibration procedures 305, which are related to but different from the factory calibration procedures that are described later and schematized in FIG. 14. The user digital camera calibration procedure 305 results in the production of numerical correction factors that can be applied to all intensity measures for all pixels in a given captured scene. This process is useful when referring photometric data to an in-house absolute or relative calibration standard or when specific types of illumination sources are used to light a scene.

Figure 7:
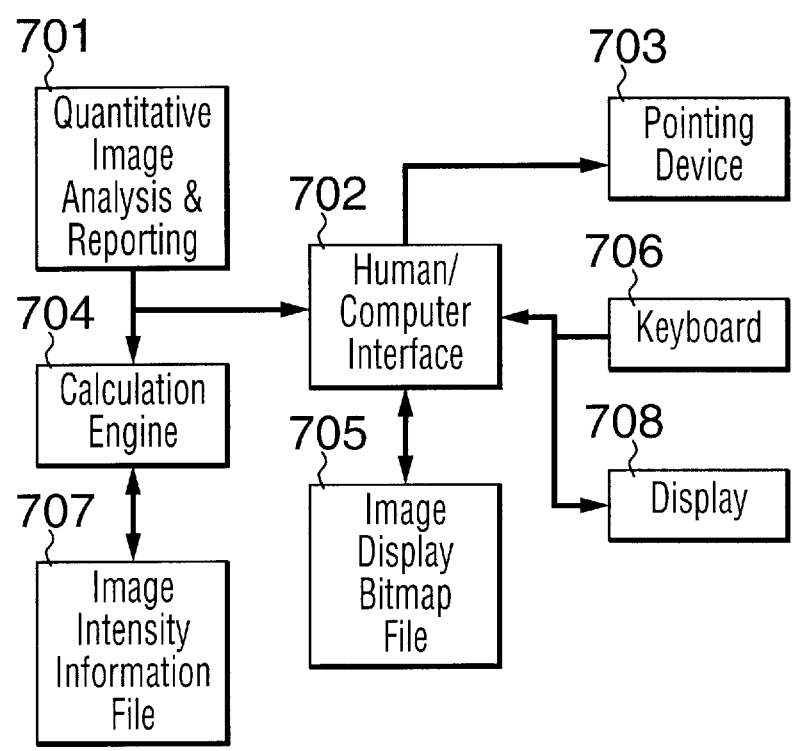
FIG. 7 is a schematic diagram showing the relationship between the image intensity information file and the image display bitmap file for quantitative image analysis and reporting functions.

FIG. 7 shows the relationship between the image intensity information file 707 and the image display bitmap file 705. The image intensity information file 707 is available to the computer's calculation engine 704 for computing various photometric functions of the original image scene. The user is only able to visually appreciate an image of the captured scene through the translation of the image display bitmap file 705 back into a visual stimulus, through the use of the human\computer interface 702 and display 708.

Figure 8:
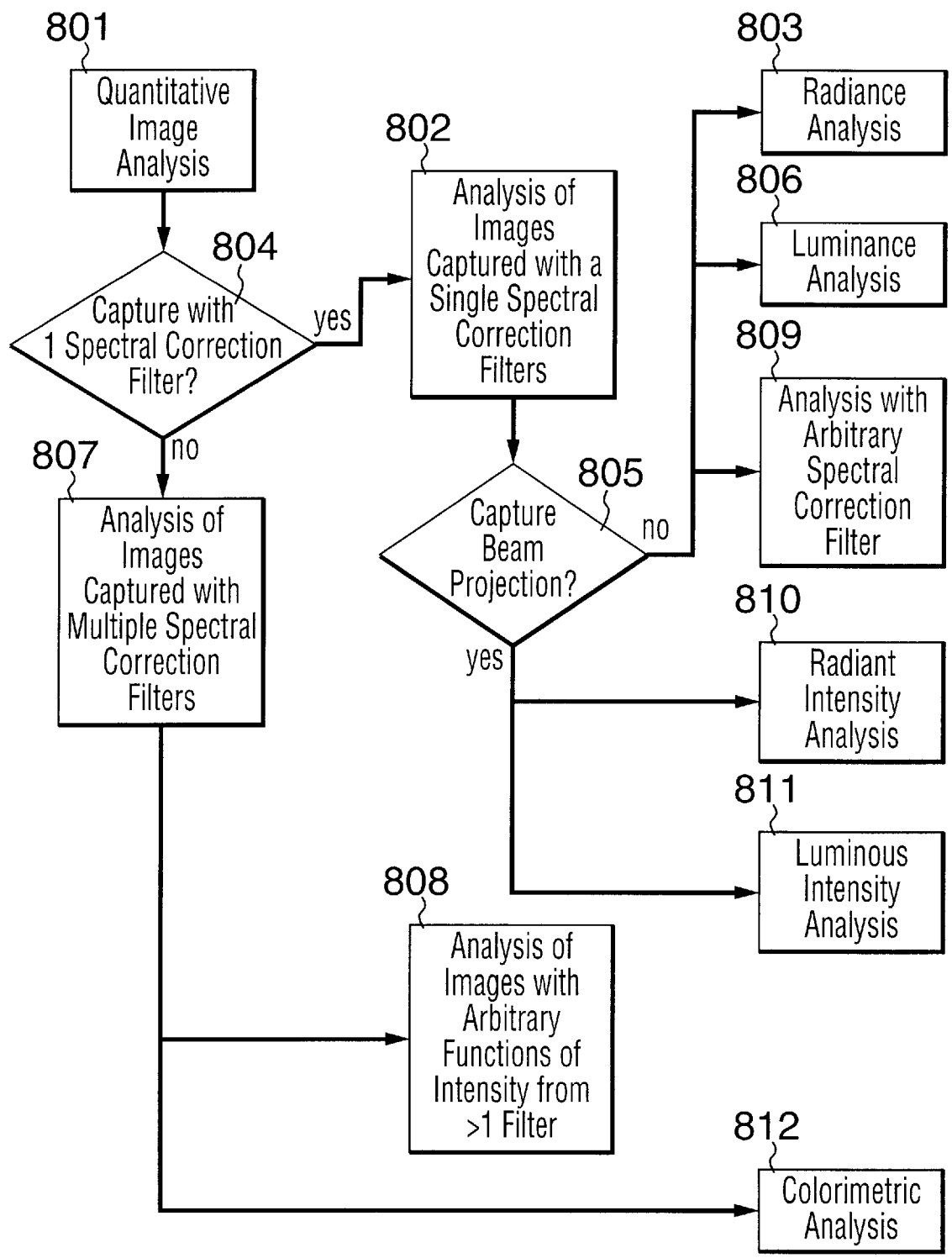
FIG. 8 illustrates the variations in the quantitative image analysis depending upon the number of spectral correction filters used during the image capture process.

The various options for performing quantitative image analysis are shown in FIG. 8. The user must determine if an image had been captured using a single spectral correction filter 4. If a single correction filter has been used to capture an image 2, the user then determines whether the image was obtained from a luminance distribution or from a beam pattern distribution (used to measure radiant intensity 10 and luminous intensity 11). If the light distribution from a beam projection pattern was not captured 5, then the user has the option of performing analysis with radiance 3, luminance 4, or analysis with an arbitrary spectral correction filter 9, such as a filter designed to correct the CCD array for the scotopic or nighttime spectral sensitivity of the human eye, rather than the photopic or daytime spectral sensitivity. If an image has been captured with more than one spectral correction filter 7 the user has the option of quantitative analysis of images with either arbitrary functions of multiple filters 8 or calorimetric analysis with specified calorimetric filters 12.

FIG. 9 shows a schematic diagram of the available processes for interactive and automatic analysis of intensity data within an image. By centering the pointing device cursor on a location within the image the system will compute various descriptive statistics of intensity for all the pixels within a series of circular areas concentric to the cursor position and report them in the appropriate measurement units 902. Various grids can also be applied and aligned to the image and the system will compute these descriptive statistics for all pixels within each cell in the grid 903. Since it is typical of the photometric measurement process to be interested in objects within a scene, the system provides the user with various means for defining one or more objects within a scene and for defining the backgrounds against which these objects are viewed 904. This process is critical to the ensuring accurate, valid and reliable measurements of the intensity of objects within the scene and for ensuring that the relationship between object and background is consistently defined.

Figure 10:
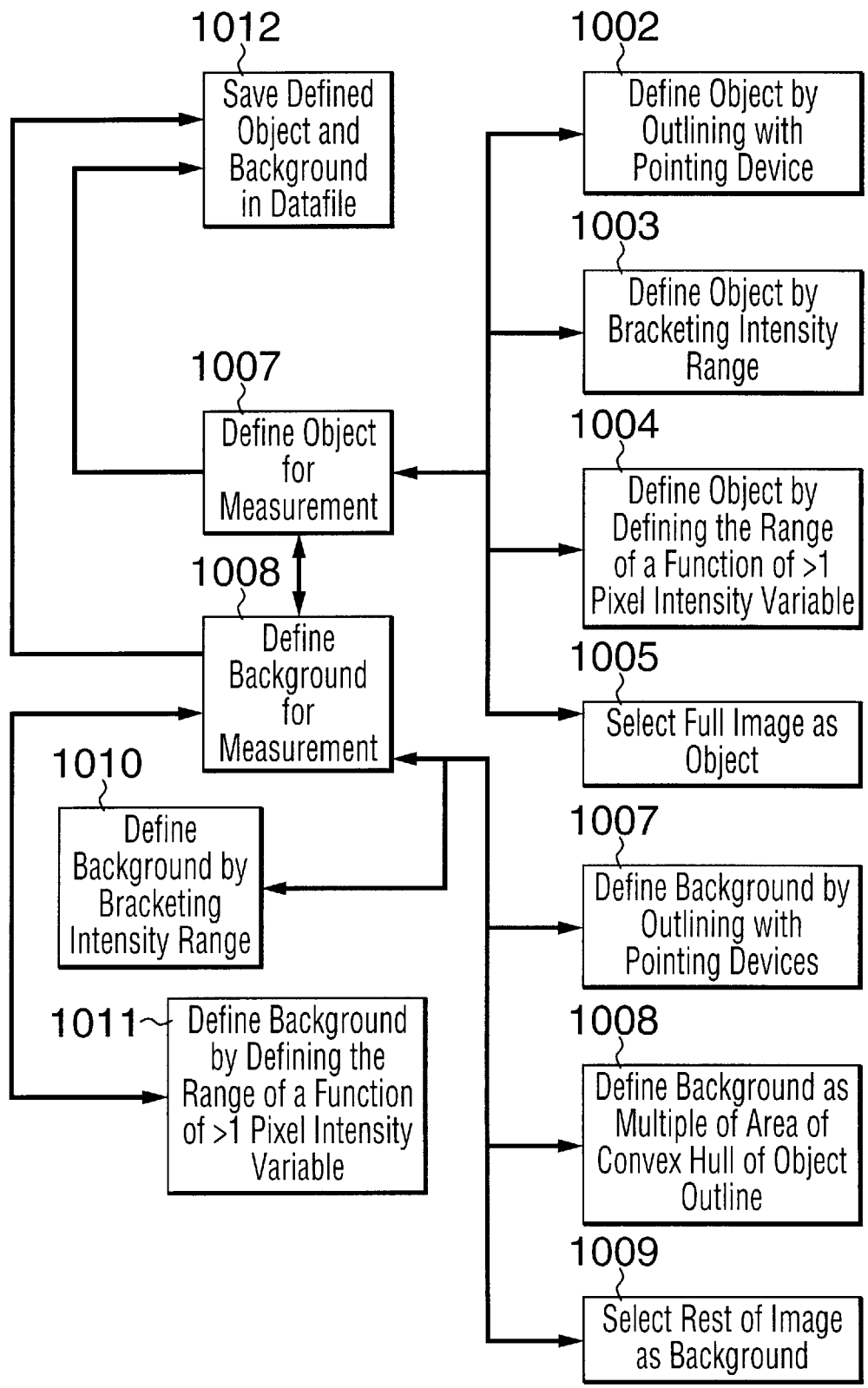
FIG. 10 shows the processes for defining an object or subset of the pixels within a captured image and the background against which it is viewed.

The various methods that are available to define both objects and the backgrounds against which they are viewed are shown in FIG. 10. If the object can be easily defined by its outline within the scene, the user may opt to outline the shape of the object with the pointing device 1002. For more complex objects (for example, the alphanumeric characters in the captured image of a visual display), the user may define the object by the range of intensity values that all pixels in the object have in distinction to those of the background against which the object is viewed. This can be done by bracketing the intensity range of the object subset of the pixels within the scene 1003. If the scene have been captured with more than one spectral correction filter (as in FIGS. 8, 7) the user may choose to define the pixels in the scene belonging to the object in terms of a function of more than one pixel intensity variable 1004. The user may also choose to define the full image as the object 1005.

Referring to FIG. 10, the background against which an object is viewed is also definable in a similar fashion to the methods used for defining the object. The background can be defined by the user by outlining with the host computer pointing device 1007. Using this method the polygon defining the object outline always remains inside the polygon defining the outline of the background. Having defined the object by outlining the user may opt for defining the background as a multiple of the area of the convex hull of the object outline 1008. In this method of defining the background the system computes the convex hull of the polygon outline of the object and iteratively expands this shape while computing the solid angle of the background. This area is compared to that of the interior of the polygon defined by the object. The iteration proceeds with the comparison of the two areas until the area of the background reaches some user-defined integer multiple of the area of the object.

Three additional optional methods of defining the background are also available in the system, as shown in FIG. 10. In the first, the user may select all pixels in the image that are not defined as part of the object 1009. In the second, the user may define the background by bracketing the intensity range of the remaining pixels in the scene not defined as those of the object 1010. Finally, for images captured with more than one spectral correction filter, the user may define the background in terms of a function of more than one pixel intensity value 1011.

Since both process 1004 and 1011 refer to defining objects in terms of more than one pixel intensity value, it can be appreciated that this includes the process of defining both objects and backgrounds by their chromaticity. One such embodiment of this process is through the use of a set of filters through which transformations can be computed resulting in chromaticity measurements of the pixels in the image as taught by the Commission Internationale de l'Eclairage or CIE. The data can then be represented in a chromaticity diagram such as the 1931 CE x,y chromaticity diagram or the 1976 CE u',v' chromaticity diagram.

Once one or more objects and backgrounds have been defined these definitions can be optionally saved in an electronic data file 1012 for future recall and use.

Referring again to FIG. 9; following the object/background definition process 904 the user can make quantitative measurements of two types: measurements based upon the photometric intensity of objects and backgrounds 905 and object dimensional analyses, including measurements of linear extent and of area 906. Descriptive statistics, such as the mean, median, range, variance, etc. of the intensity values of the defined object(s) and background(s) are automatically computed by the system 907 as are various functions of the relationship between defined object and background, called contrast metrics 908. Several different contrast metrics are automatically computed. The different metrics. which are all derived from measures of defined objects and defined backgrounds, provide meaningful quantitative measures to various interest groups and individuals with various areas of expertise within lighting measurement community.

The user may also optionally define a reference area within the scene and the system will compute the ratio of every pixel intensity in the scene that is outside this reference area to the average of the pixels within the defined area 909. This measurement procedure can be visualized through the use of pseudo-color mapping of the intensity scale within the image. Using this method the intensity range within the pixels of the image is quantized into n discrete intervals or "bins" and each bin is assigned a perceptually discrete color. Thus, when the image is viewed the color of a given pixel or groups of pixels provides the user with a convenient means of visualizing the intensity ratio defined above.

Two defined objects from either the same image or from different images can also be compared 12. The differences between the objects and between their defined backgrounds are computed for both intensitive descriptive statistics and for dimensional measurements. Arithmetic operations can be applied to images using both unary and binary operators and transformations 904. A typical example of such operations is the subtraction of one image from another, as is often done to determine what has changed in a scene between two sample periods.

Various visual performance metrics that depend upon both the intensitive contrast and linear and/or area extend measures are automatically computed by the system in process 915. Through the use of visual ergonomic data stored in a database 913 predictions of the visual performance of individuals can be estimated 916. The visual range of objects can be automatically computed in process 917, which incorporates mathematical models of light scatter to the transmission of contrast metrics calculated in process 908. The visual range of an object is thus defined as the distance from the observer at which the contrast falls below a specified critical value.

The results of various quantitative analyses applied to defined objects and backgrounds are automatically displayed in graphical and tabular form within the visual display and/or printed as hardcopy reports. Additional hardcopy generation capabilities are described in a later module.

Figure 11:
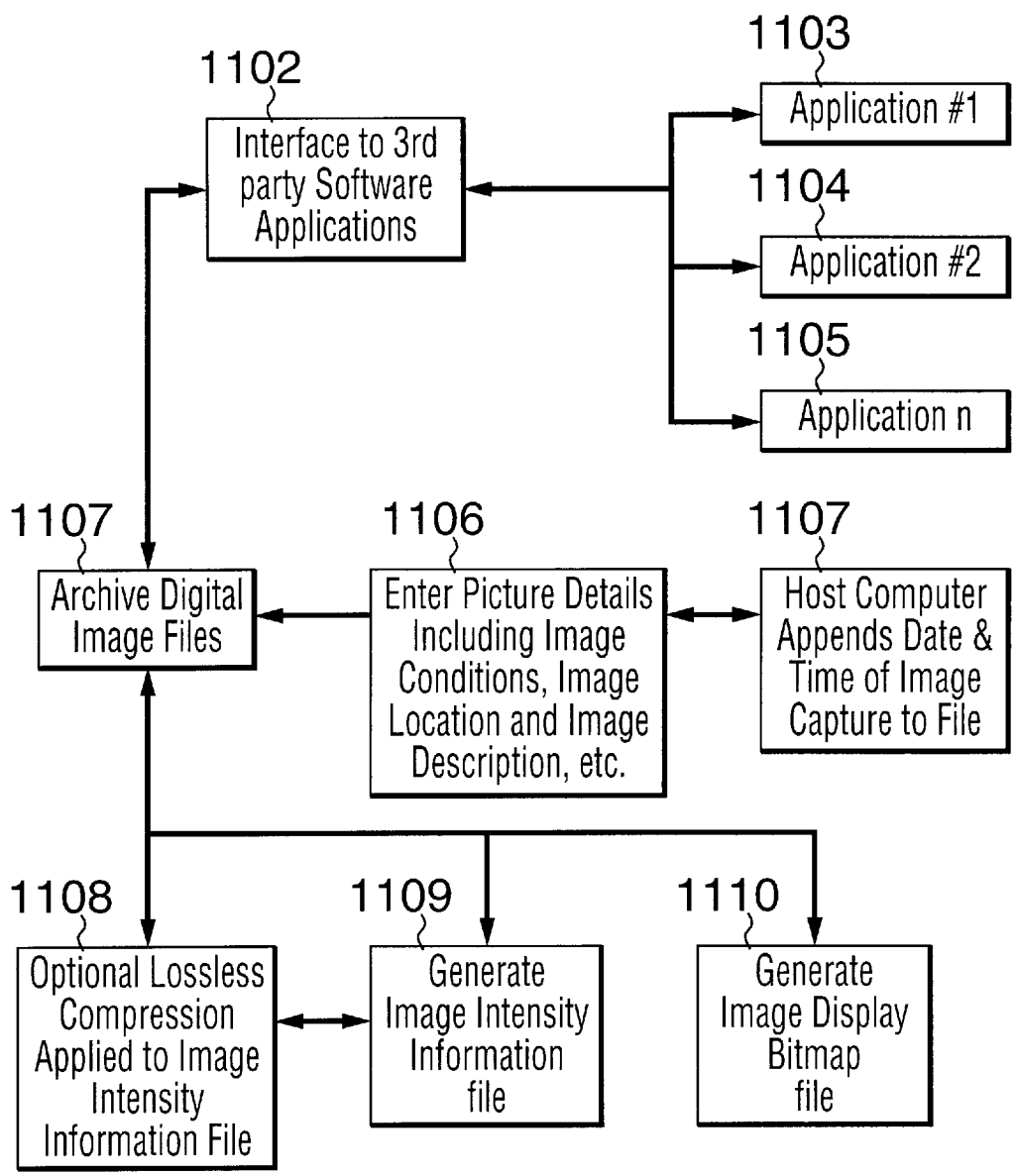
FIG. 11 illustrates the procedures associated with archiving a composite image and the subsequent analysis applied to it, including a means of exporting these files to third party software applications;.

After image capture or once the quantitative analysis has been carried out on a given image the captured image and quantitative results can be stored in a digital image file archive as shown in FIG. 11. The user enters various pieces of information 1106 regarding the details of the pictures analyzed through the host computer keyboard and the host computer appends the date and time of image capture to the file in the archive 1107. The archiving process 1101 generates two related files for storage: the image intensity information file 1109 and the image display bitmap file 1110. This process optionally permits lossless compression to be applied to the image intensity information file 1108.

Image intensity information files can be optionally exported to 3rd party software applications 1102. This process permits several file formats and export/import protocols to be developed within the system that conform to Microsoft Windows file transfer protocols.

Figure 12:
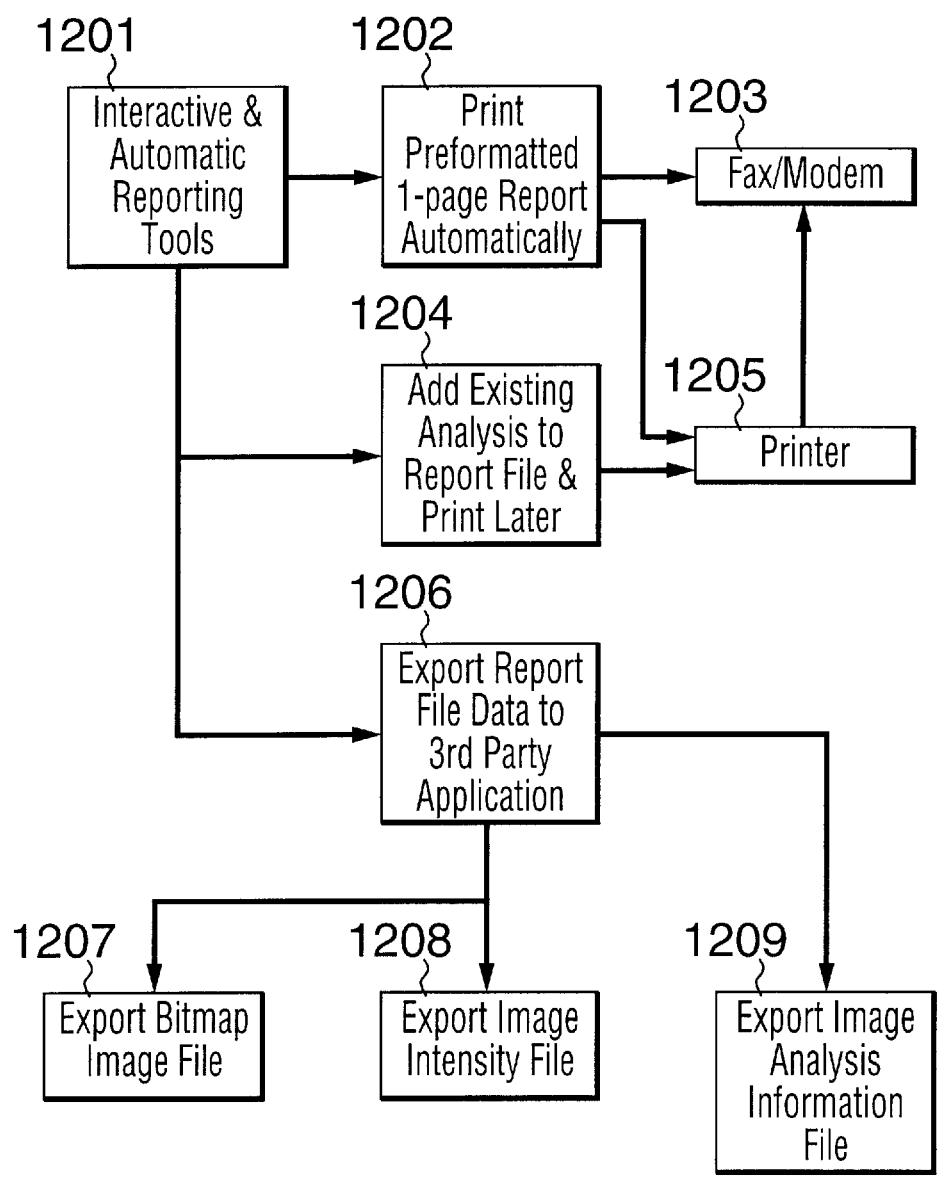
FIG. 12 illustrates the interactive and automatic reporting tools offered by the system.

FIG. 12 schematizes the various options available for reporting the results of the quantitative analyses performed upon captured images. The term reporting herein refers to the process of producing the report as output on either a hardcopy on a printer 1205 or an electronic file transmitted to another site or facsimile machine via a modem 1203. Interactive and automatic reporting tools 1201 permit the user to instantly output a series of preformatted single-page reports at the conclusion of each measurement process from the host computer 1202 or to append each report to an accumulation file and output them all at once at a later time 1204. Stored report files can also be exported to a 3rd party application. The image bitmap file 1207, the image intensity information file 1208 and the file containing the results of the image analysis 1209 can be exported separately.

Figure 13:
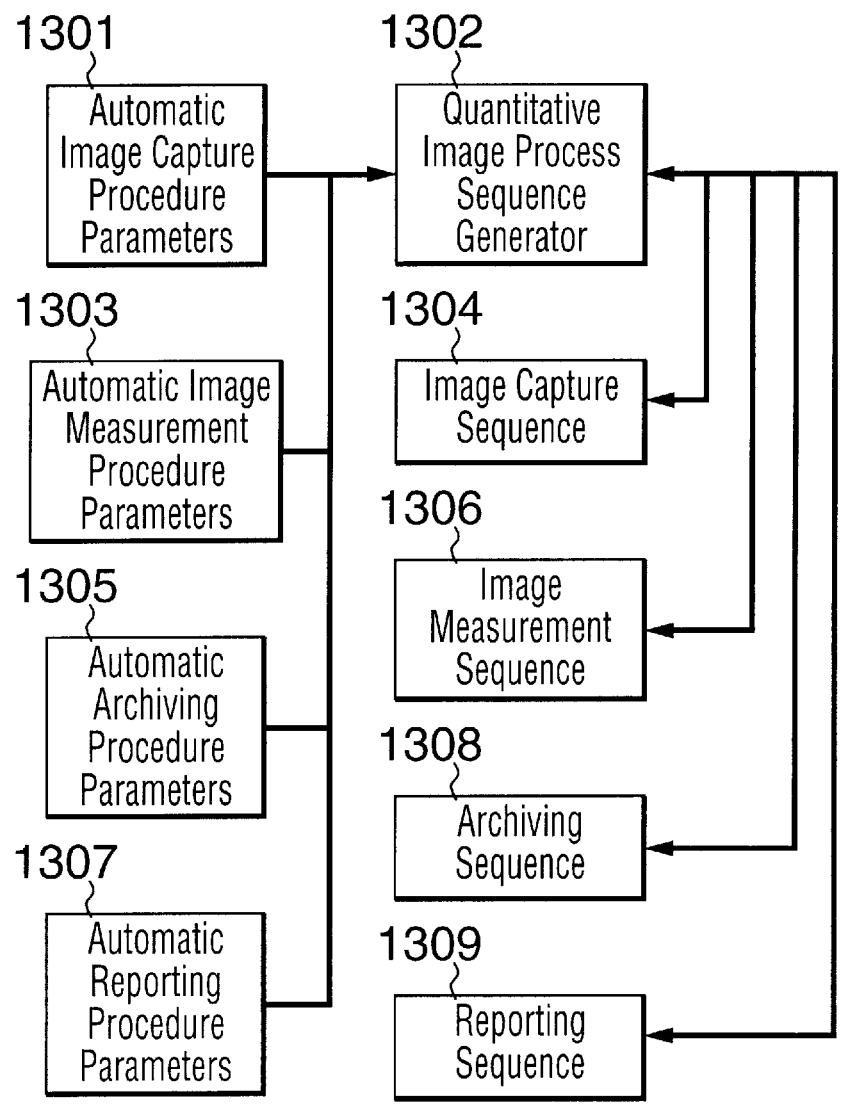
FIG. 13 shows the automation process whereby all stages of image capture, analysis, archiving and reporting are combined in the a single process.

The image capture, analysis, archive and reporting functions as separately outlined above, can also be incorporated into a process whereby all functions are automated. FIG. 13 shows how the quantitative image process sequence generator 1302 receives programming inputs from each of the four processes, image capture 1301 image measurement 1303 archiving 1305 and reporting 1307. The sequence generator produces a control sequence from these inputs to cause the four processes image capture 1304, image measurement 1306, archiving 1308, and reporting 1309 to be iteratively executed. This is useful where repetitive analysis of the intensitive and dimensional properties of objects within images must be carried out. An example of this requirement is where quality inspection is performed on a lighting product at a production stage within a manufacturing process.

Figure 14:
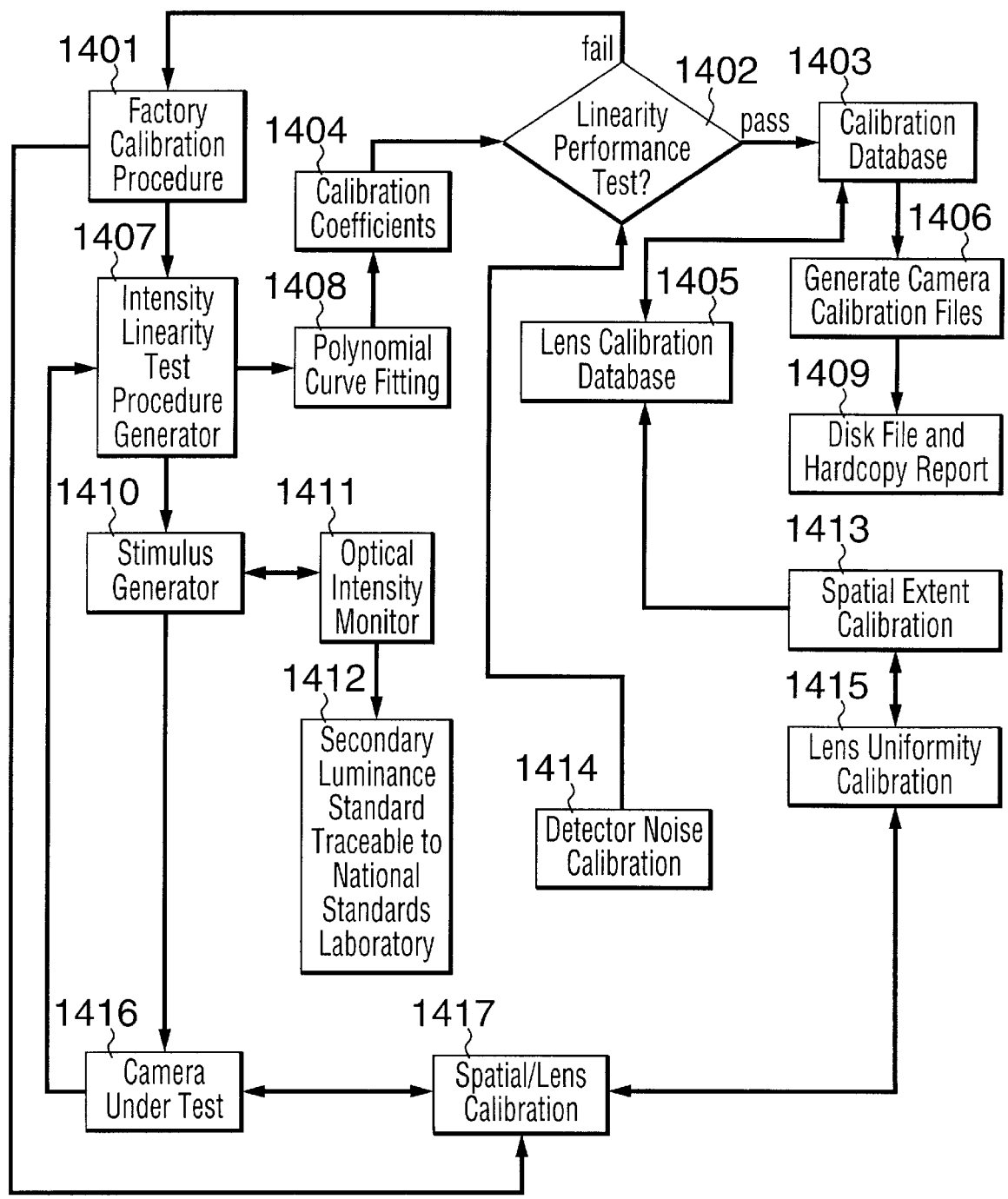
FIG. 14 shows the processes involved in calibrating the digital camera for use with the system.

A schematic of the factory calibration process applied to the digital camera is shown in FIG. 14. A number of calibration procedures are carried out on a given digital camera/lens combination. The tests include linearity of the intensity scale 1407, spatial resolution 1417, spatial extent 1413, lens and field uniformity 1415 and detector noise 1414. For each test the camera is mounted on a stable platform in the calibration facility where it is aligned and focused the stimulus target(s) appropriate for a given test. For the linearity test the camera is presented with a large series of spatially uniform targets produced by the output of a stimulus generator 1410 under control of a dedicated computer system. The intensity of the stimulus from this generator is monitored by an optical intensity monitor 1411 that has, itself, been calibrated with reference to a secondary standard light source traceable to a National Standards Laboratory.

The intensity linearity calibration procedure 1407 involves capturing a very large number of images for each lens focal length and aperture setting, where the control commands for the production of each image are obtained from a calibration file in the intensity linearity test generator 1407. For each calibration image presented at a fixed intensity, a series of images is captured where each image in the series is obtained at a different frame sampling period. The full range of sampling periods is represented in the series. From these data the arithmetic mean of digitized intensity values as a function of pixel position are obtained and used as input to a polynomial curve fitting procedure 1408. The output of this procedure is used to generate a set of calibration coefficients 1404 which are used to estimate the intensity of any arbitrary stimulus input to the camera.

Referring again to FIG. 14, the accuracy of the intensity coefficients developed in the linearity calibration procedure 1407 are tested through the use of a linearity performance test 1402. This test introduces a large number of calibrated intensity stimuli back into the camera which captures the images and computes the average intensity of local regions of the array. The system then computes the difference between the estimated intensity and the measured intensity from the optical intensity monitor 1411. After the test is complete a decision is made as to whether the calibration is acceptable. If the calibration is acceptable the coefficients are stored in the camera calibration database 1403 from which the camera calibration files are generated 1406. Copies of this calibration file are then made, along with a hardcopy report of the results of the performance test 1409. If the calibration test fails 2 the calibration linearity test process 1407 is repeated whereupon the linearity test is repeated. Cameras that fail the performance test 2 twice are removed from production and rebuilt.

I claim:

1. A photometric measurement apparatus, comprising:
   a) a digital video camera for generating digital data representing the image of a scene of interest;

b) means for stepwise changing the exposure duration of the camera;

c) means for controlling said camera to create automatically a series of digital images of the same scene over a range of different exposures;

d) means for storing the digital images;

e) means for assembling data from said series of digital images at each picture element of interest to create a single composite digital image containing data from at least some of said digital images and representing at each picture element an intensity dynamic range greater than that obtainable from any single image;

f) means for storing said assembled data representing said composite digital image; and g) means for producing a compressive transformation of the assembled data forming said composite image to generate a display image of the original scene, each point in the display image being correlated with a corresponding point in the composite image.

2. A photometric measurement apparatus as claimed in claim 1, wherein said camera is a digital still-frame camera.

3. A photometric measurement apparatus as claimed in claim 2, wherein said exposure changing means comprises means for changing the effective shutter duration of the camera.

4. A photometric measurement apparatus as claimed in claim 3, wherein said means for changing the effective shutter duration comprises means for changing the sampling period via a sample-and-hold circuit determining the exposure of the video camera.

5. A photometric measurement apparatus as claimed in claim 1, wherein said combined data are stored as a computer file.

6. A photometric measurement apparatus as claimed in claim 1, further comprising means for displaying on a screen a visual image spatially coinciding with said composite image, means for identifying one or more regions of interest in said display screen, and means for extracting from said combined stored data, intensity information pertaining to said region of interest over a dynamic range greater than possible from said display image alone.

7. A photometric measurement apparatus as claimed in claim 6, wherein said identifying means includes a pointing device for delineating said region of interest on the screen.

8. A photometric measurement apparatus as claimed in claim 1, wherein only data from a subset of each image is combined into said composite image.

9. A photometric measurement apparatus as claimed in claim 1, further comprising optical filter means to correct the spectral sensitivity of said camera.

10. A method of carrying out photometric measurement analysis, comprising the steps of:

a) generating data representing an electronic image of a scene of interest with a video camera for;

b) stepwise changing the exposure of the video camera over a predetermined range of values;

c) automatically controlling said camera to create a series of images of the same scene over said predetermined range;

d) storing said images;

e) combining the data from said series of images at each picture element of interest to create a composite image containing data from at least some of said images and representing at each picture element a dynamic range greater than can be acquired in any single image;

f) storing said combined data representing said composite image; and g) producing a compressive transformation of the assembled data forming said composite image to generate a display image of the original scene, each point in the display image being correlated with a corresponding point in the composite image.

11. A method as claimed in claim 10, wherein said exposure is changed by changing the effective shutter duration of the camera.

12. A method as claimed in claim 11, wherein the sampling period of a sample-and-hold circuit determining the exposure of the video camera is changed to change said effective shutter duration.

13. A method as claimed in claim 10, wherein said combined data are stored as a computer file.

14. A method as claimed in claim 10, wherein a real image coinciding with said pseudo-image is displayed on a computer screen, a region of interest in said real image on said screen is identified with a pointing device, and intensity information pertaining to said region of interest over a dynamic range greater than possible from said real image alone is extracted from said combined stored data by a computer.

15. A method as claimed in claim 10, wherein only the data from a subset of each image is combined into said composite image.

16. A method as claimed in claim 10, wherein said camera is calibrated by viewing a large number of scenes of known illumination and measuring the response over the area of the photodiode array in the camera.

17. A method as claimed in claim 10, wherein a filter compensate compensates electronically for the non-linear response over the area of the photodiode array.

18. An intelligent camera for performing photometric measurements, comprising a sensor array for generating data representing an electronic image of a scene of interest; means for stepwise changing the exposure of the array to a scene of interest; means for controlling said exposure changing means to create automatically a series of images of the same scene over a range of exposures; means for storing said images as files; means for combining data from said series of image files at each picture element of interest to create a composite image file containing data from at least some of said images and representing at each picture element a dynamic range greater than can be acquired in any single image; means for storing said combined data as composite files representing said composite image; and means for producing a compressive transformation of the data in said composite image to generate a display image of the original scene, each point in the display image being correlated with a corresponding point in the composite image.

19. An intelligent camera as claimed in claim 18, further comprising an electronic filter for compensating for spectral non-linearity in the response of said sensor array.

* * * * *